United States Patent
Tseng et al.

(10) Patent No.: US 8,138,732 B2
(45) Date of Patent: Mar. 20, 2012

(54) DCR SENSE FOR A COT POWER CONVERTER

(75) Inventors: Cheng-De Tseng, Tainan (TW); Chia-Jung Lee, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 426 days.

(21) Appl. No.: 12/461,210

(22) Filed: Aug. 5, 2009

(65) Prior Publication Data

US 2010/0033145 A1 Feb. 11, 2010

(30) Foreign Application Priority Data

Aug. 7, 2008 (TW) .............................. 97130139 A

(51) Int. Cl.
*G05F 1/40* (2006.01)
(52) U.S. Cl. ........................................ 323/282
(58) Field of Classification Search ......... 323/279–285, 323/351
See application file for complete search history.

(56) References Cited

U.S. PATENT DOCUMENTS

| | | | | |
|---|---|---|---|---|
| 6,979,985 | B2 * | 12/2005 | Yoshida et al. | 323/282 |
| 7,091,711 | B2 * | 8/2006 | Yoshida et al. | 323/282 |
| 7,109,693 | B2 * | 9/2006 | Yoshida et al. | 323/282 |
| 7,202,642 | B1 * | 4/2007 | Chen et al. | 323/222 |
| 7,423,414 | B1 * | 9/2008 | Culpepper et al. | 323/280 |
| 7,508,181 | B2 * | 3/2009 | Chen et al. | 323/282 |
| 2010/0270989 | A1 * | 10/2010 | Sasaki et al. | 323/282 |
| 2010/0308784 | A1 * | 12/2010 | Scoones et al. | 323/282 |

\* cited by examiner

*Primary Examiner* — Adolf Berhane
(74) *Attorney, Agent, or Firm* — Muncy, Geissler, Olds & Lowe, PLLC

(57) ABSTRACT

A DCR sense scheme is provided to sense the inductor current of a COT power converter. The DCR sense is implemented by using the direct current resistance of the output inductor of the COT power converter, and thus eliminates the ESR limitations on the type of output capacitors for stability concern. A quick response mechanism is further incorporated in the COT power converter to speed up the transient response of the COT power converter.

14 Claims, 6 Drawing Sheets

DCR SENSE FOR A COT POWER CONVERTER

FIELD OF THE INVENTION

The present invention is related generally to power converters and, more particularly, to a constant on-time (COT) power converter.

BACKGROUND OF THE INVENTION

In recent years, constant on-time (COT) structure is applied in wide-input-voltage-range systems generally. However, the stability of COT structure is always suffered from limitations on the effective series resistance (ESR) of output capacitors. As shown in FIG. 1, a COT structure 10 in common use includes a controller 12 to provide control signals UG and LG to switch the serially connected power switches SW1 and SW2 in a switching circuit 14, in order to modulate the output inductor current IL flowing through an output inductor L1 and charging an output capacitor COUT to generate an output voltage Vo. The control signals UG and LG have pulse widths determined by the input voltage Vin and the output voltage Vo while a constant frequency within the whole input voltage range. The controller 12 relies on the ESR of the output capacitor COUT to act as a current sense resistor, so the ripple of the output voltage Vo provides the pulse width modulation (PWM) ramp signal. The pulse width of this one shot is determined by the input voltage Vin and the output voltage Vo to keep the frequency fairly constant over the input voltage range. "Double-pulsing" is a way to identify the unstable operation of a COT structure and occurs due to noise on the output or because the ESR of the output capacitor COUT is too low that there is not enough voltage ramp in the output voltage signal. For this reason, a capacitor with very small ESR, such as a ceramic capacitor, is not applicable to the output capacitor of a COT structure.

Therefore, it is desired a solution that can make a COT structure stable by using ceramic output capacitors and no longer affects the equivalent value of combination of the ESR of the output capacitor and capacitive load.

SUMMARY OF THE INVENTION

An object of the present invention is to provide a direct current resistor (DCR) sense scheme for a COT power converter.

Another object of the present invention is to improve load transient of a COT power converter.

According to the present invention, a DCR sense scheme is provided to sense the inductor current of a COT power converter. The DCR sense is implemented by using the direct current resistance of the output inductor of the COT power converter to generate a feedback signal to determine the control signal for controlling the switching circuit of the COT power converter. The proposed sensing circuit includes a first resistor connected between an end of the output inductor and a node, a sense capacitor connected between the node and the other end of the output inductor, a second resistor shunt to the sense capacitor, and a third resistor connected between the node and a ground terminal. The combination of the sense capacitor and the first resistor senses the inductor current to generate the feedback signal, and the combination of the first, second and third resistors detect the DC level of the output voltage.

According to the present invention, a COT power converter does not rely on the ESR of the output capacitor to sense the inductor current and thus, its stability is not affected by the ESR of the output capacitor. A quick response mechanism may be additionally introduced into the COT power converter to trigger a quick response signal according to the feedback signal and the output voltage, in order to speed up the transient response of the COT power converter. The quick response mechanism includes a first circuit to detect the output voltage to generate a first signal, a second circuit to generate a second signal according to the first signal and a reference voltage, a third circuit to generate a third signal according to the second signal and the reference voltage, and a fourth circuit to trigger the quick response signal according to the third signal and the feedback signal.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
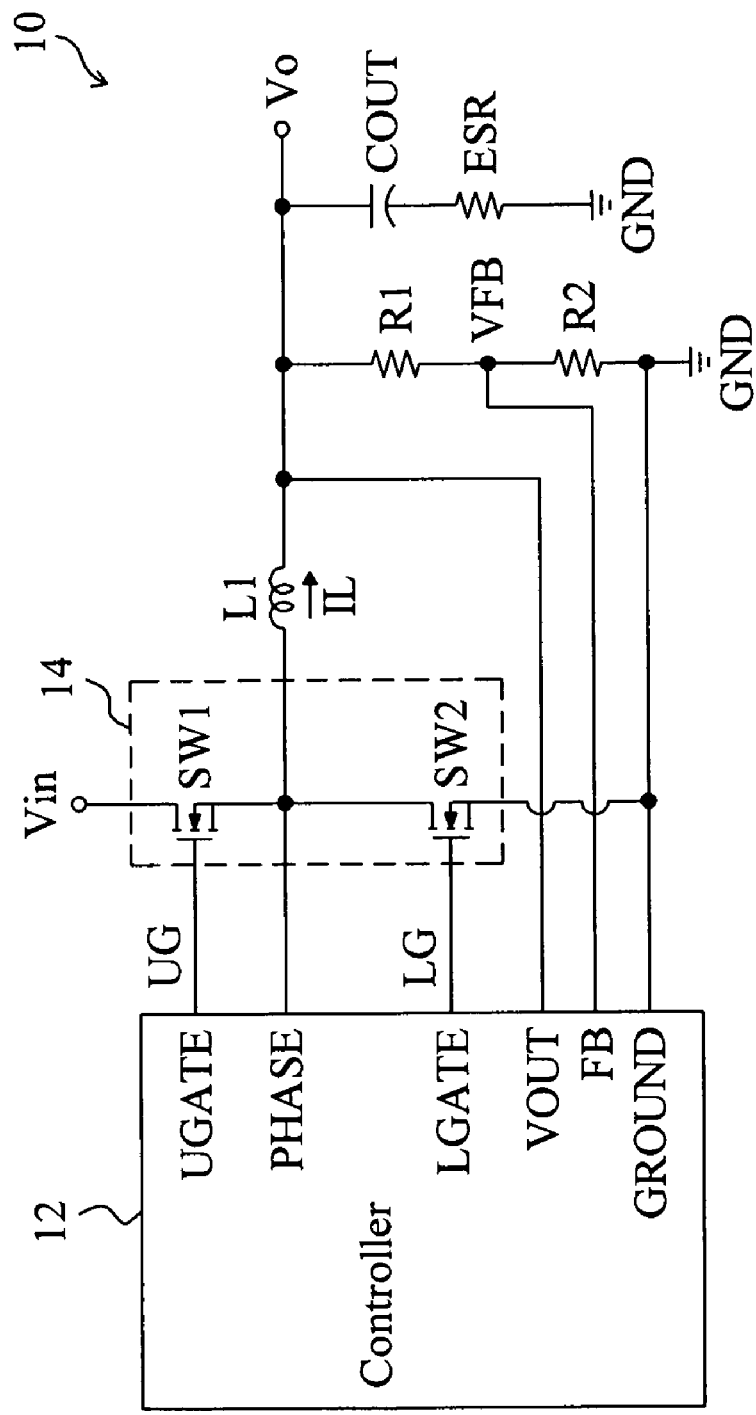
FIG. 1 is a diagram showing a COT structure in common use.
Figure 2:
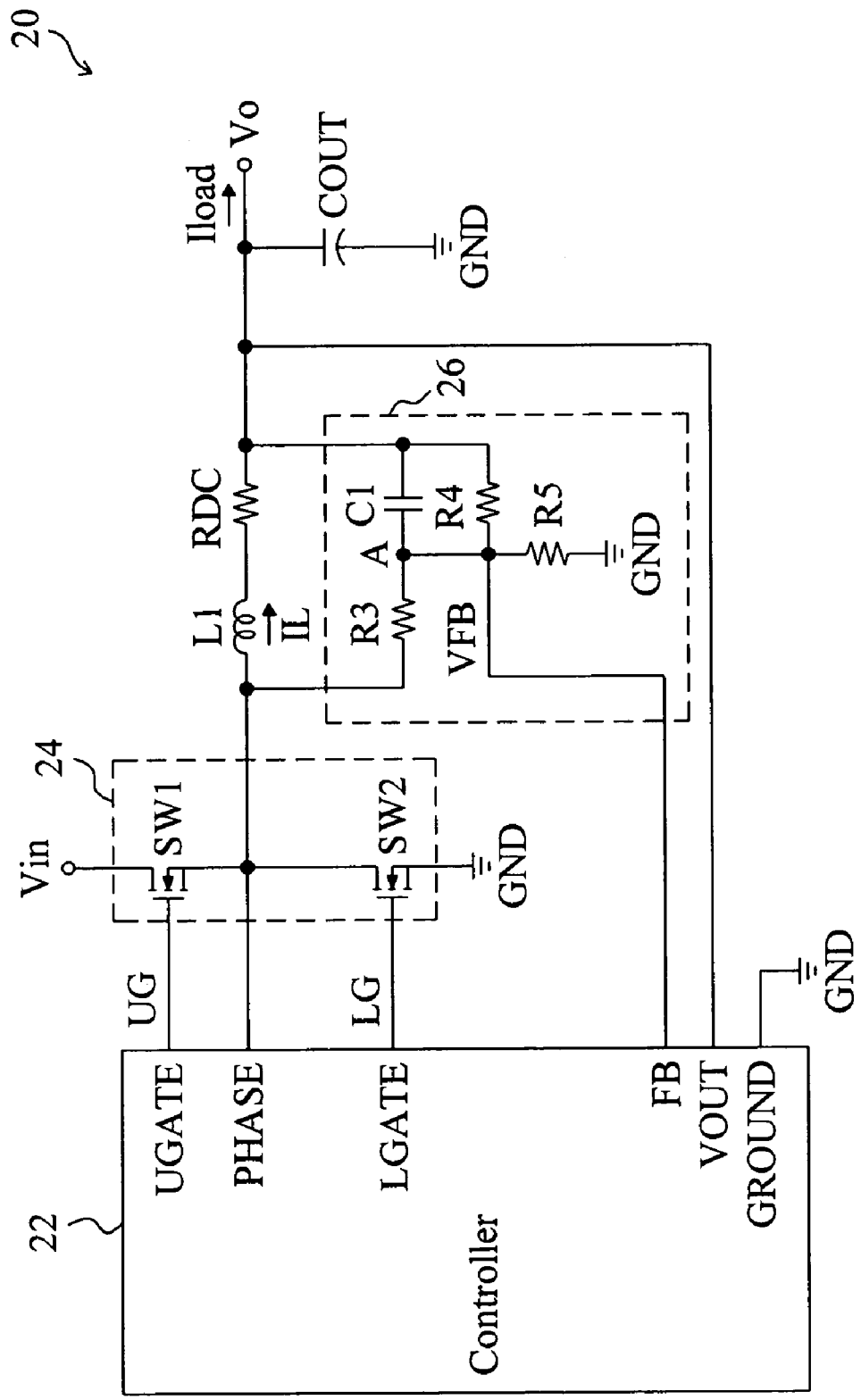
FIG. 2 is a diagram of a first embodiment according to the present invention.

FIG. 2 is a diagram of a first embodiment according to the present invention, in which a COT power converter 20 includes a controller 22 to provide control signals UG and LG, and an output capacitor COUT, an output inductor L1 and a switching circuit 24 being configured such that the switching circuit 24 is controlled by the control signals UG and LG to modulate the inductor current IL flowing through the output inductor L1 and charging the output capacitor COUT to generate an output voltage Vo. In the switching circuit 24, power switches SW1 and SW2 are connected in series and switched by the control signals UG and LG, respectively. The direct current resistance (DCR) of the output inductor L1 is represented by a resistor RDC. A sensing circuit 26 is connected to the two ends of the output inductor L1 and senses the inductor current IL by using the resistor RDC, so as to generate a feedback signal VFB for the controller 22 to determine the control signals UG and LG The sensing circuit 26 includes a resistor R3 connected between an end of the output inductor L1 and a node A, a sense capacitor C1 connected between the node A and the other end of the output inductor L1, a resistor R4 shunt to the sense capacitor C1, and a resistor R5 connected between the node A and a ground terminal GND. The resistor R3 and the sense capacitor C1 constitute an RC network, and the resistors R3, R4 and R5 constitute a voltage divider to determine the DC level of the output voltage Vo.

As shown in FIG. 2, the DC voltages across the sense capacitor C1 and the resistor RDC will be the same, i.e. $V_{C1\_avg} = V_{RDC\_avg}$. Thus, derived through a voltage-second method, the feedback signal VFB has variation by each cycle as $$\Delta VC1 = [Vin \times D \times (1-D)]/(R3 \times C1 \times Fs), \quad [\text{Eq-1}]$$

and the output voltage is $$Vo = \left(\frac{R3 \times R4 + R4 \times R5 + R3 \times R5}{R3 \times R4 + R4 \times R5}\right) \times VFB - \quad [\text{Eq-2}]$$

$$\left(\frac{R5}{R3+R5}\right) \times Iload \times RDC,$$

where Vin is the input voltage of the switching circuit 24, D is the duty cycle of the control signal UG, Fs is the operating frequency of the COT power converter 20, and Iload is the load current provided by the output Vo of the COT power converter 20. From the equation Eq-1, the ripple $\Delta VC1$ of the feedback signal VFB is determined by the resistor R3 and the sense capacitor C1 and can be used to determine the control signals UG and LG. Thus, the sensing circuit 26 can extract information about the inductor current IL. This DCR sense does not rely on the ESR of the output capacitor COUT to act as a current sense resistor and provide PWM ramp signal. Thus, the ESR limitations on the type of output capacitors for stability concern are eliminated. Even if the output capacitor COUT has no effective series resistance, the COT power converter 20 can still operate stably. Furthermore, it makes a small voltage droop by adding the resistor R5 according to the second term of the equation Eq-2 when the system is operating in heavy load. In a word, the proposed DCR sense scheme can acquire PWM ramp signal even if the output capacitors are without ESR element and make system work under stable situation.

Figure 3:
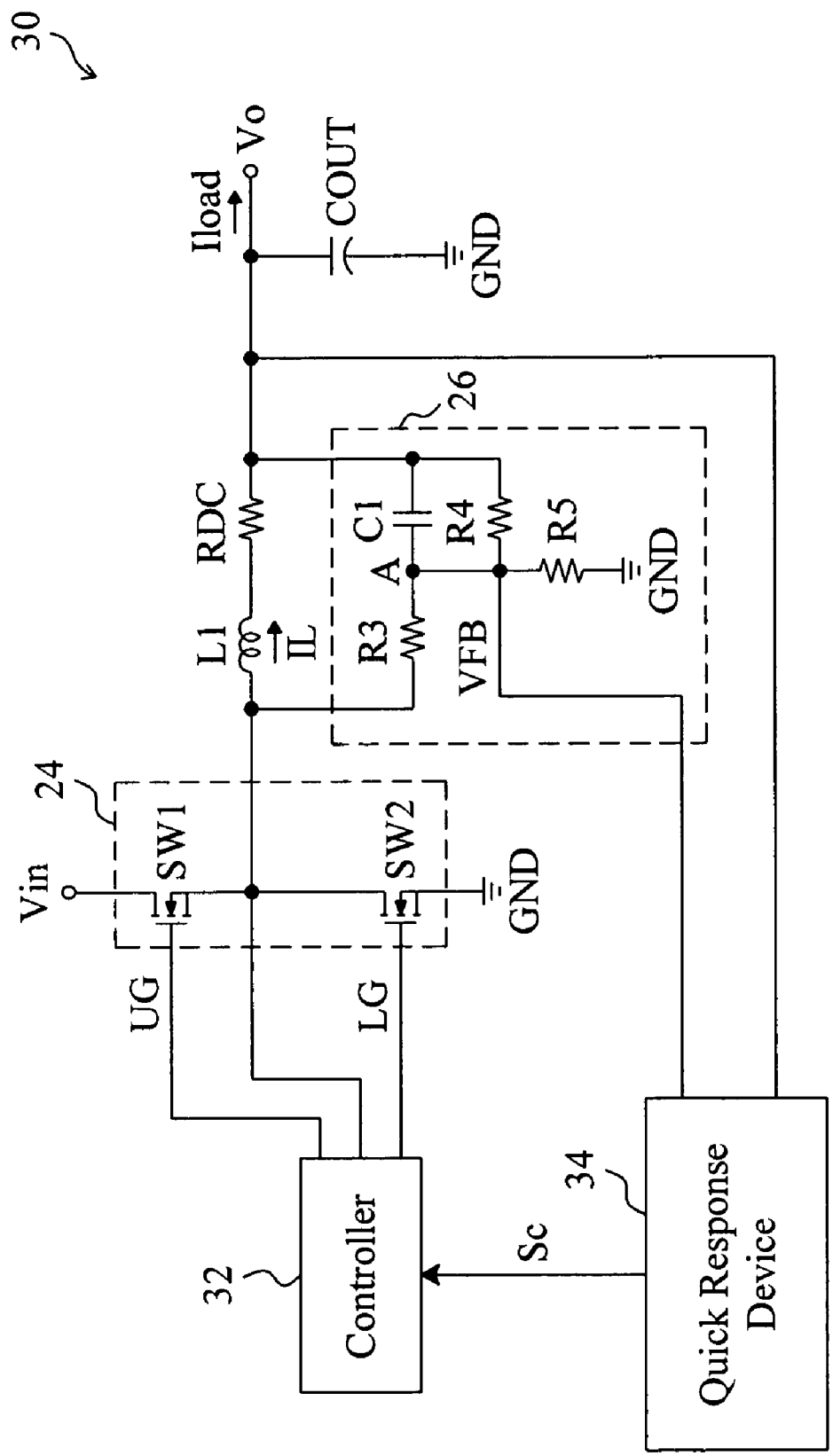
FIG. 3 is a diagram of a second embodiment according to the present invention.

In order for better transient response, a quick response mechanism may be additionally introduced into a COT power converter, as shown in FIG. 3. This power converter 30 has the same COT structure as that shown in FIG. 2, with a quick response mechanism 34 connected to the output Vo and the sensing circuit 26 to trigger a quick response signal Sc for a controller 32 to determine the control signals UG and LG. The quick response mechanism 34 triggers the quick response signal Sc according to the feedback signal VFB and the output voltage Vo, in order to improve load transient of the COT power converter 30.

Figure 4:
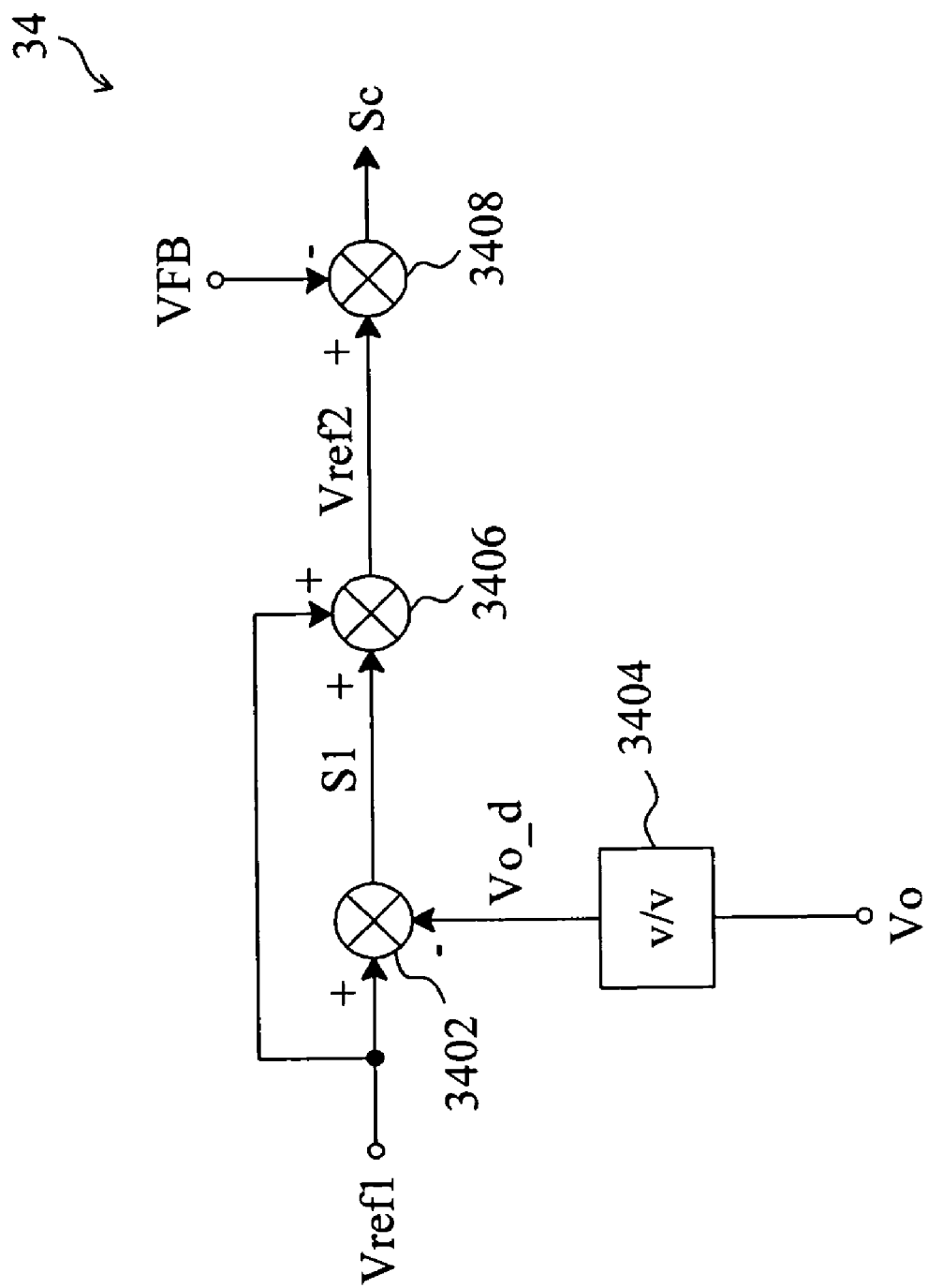
FIG. 4 is a signal flowchart of the quick response mechanism shown in FIG. 3.

FIG. 4 is a signal flowchart of the quick response mechanism 34 shown in FIG. 3, in which a first circuit 3404 handles the output voltage Vo to generate a voltage Vo_d which is a function of the output voltage Vo, a second circuit 3402 generates a signal S1 according to the voltage Vo_d and a reference voltage Vref1, a third circuit 3406 generates a voltage Vref2 according to the signal S1 and the reference voltage Vref1, and a fourth circuit 3408 triggers the quick response signal Sc according to the voltage Vref2 and the feedback signal VFB. The circuits 3402, 3404, 3406 and 3408 may be any kind of signal processing circuits. When load transient occurs, the variation of the output voltage Vo can result in immediate variation of the voltage Vref2 and consequent triggering of the quick response signal Sc, thereby speeding up the transient response.

Figure 5:
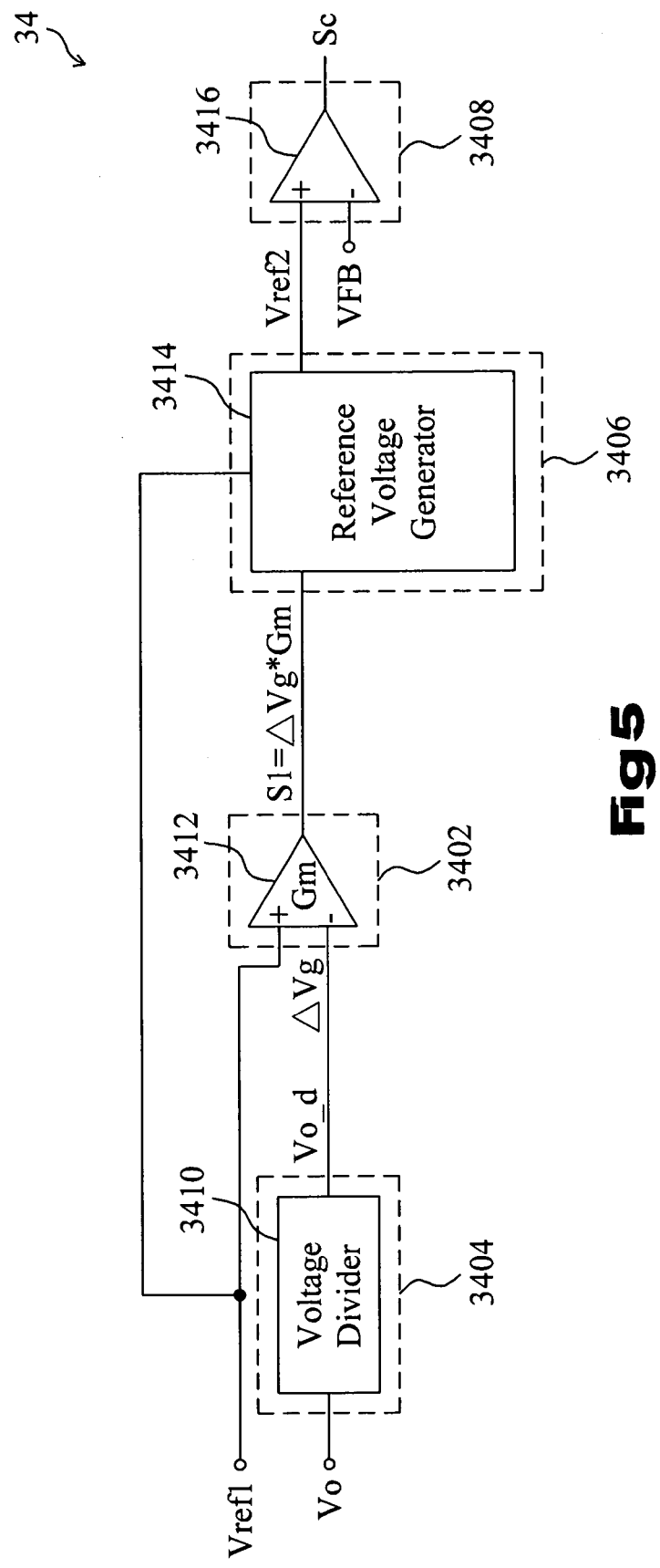
FIG. 5 is a circuit diagram of an embodiment for the quick response mechanism shown in FIG. 3.

FIG. 5 is a circuit diagram of an embodiment for the quick response mechanism 34 shown in FIG. 3, in which the first circuit 3404 includes a voltage divider 3410 to divide the output voltage Vo to generate the voltage Vo_d, the second circuit 3402 includes a transconductive amplifier 3412 to amplify the difference $\Delta Vg$ between the voltage Vo_d and the reference voltage Vref1 to generate the signal $$S1 = \Delta Vg \times Gm, \quad [\text{EQ-3}]$$

where Gm is the transconductance of the transconductive amplifier 3412, the third circuit 3406 includes a reference voltage generator 3414 to generate the voltage Vref2 according to the signal S1 and the reference voltage Vref1, and the fourth circuit 3408 includes a comparator 3416 to compare the voltage Vref2 with the feedback signal VFB to trigger the quick response signal Sc. When the COT power converter 30 operates in steady state, the voltage Vo_d is equal to the reference voltage Vref1 and therefore, $\Delta Vg$ is zero and quick response is not triggered. In response to load transient, the output voltage Vo varies and $\Delta Vg$ is no longer zero. As a result, the reference voltage Vref2 is changed to speed up the transient response.

Figure 6:
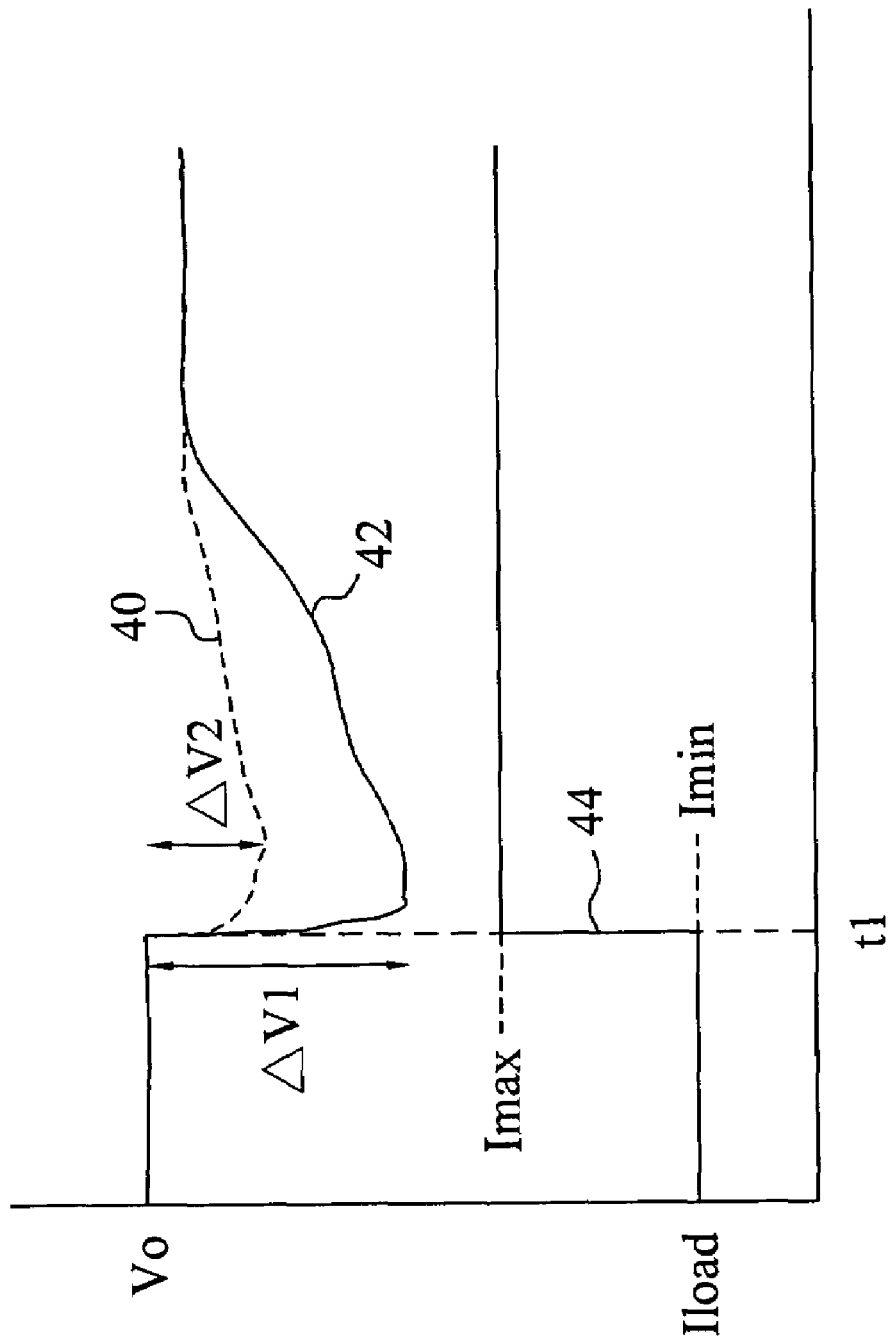
FIG. 6 is a waveform diagram of the COT power converters shown in FIGS. 2 and 3.

FIG. 6 is a waveform diagram of the COT power converters 20 and 30 shown in FIGS. 2 and 3, in which waveform 40 represents the output voltage Vo of the COT power converter 30, waveform 42 represents the output voltage Vo of the COT power converter 20, and waveform 44 represents the load current Iload. When load transient condition occurs at time t1, the load current Iload raises from Imin to Imax as shown by the waveform 44. The output voltage Vo of the COT power converter 20 falls down by $\Delta V1$ and then recovers to its original level as shown by the waveform 42. In another case, the output voltage Vo of the COT power converter 30 falls down by $\Delta V2$ and then recovers to its original level as shown by the waveform 40. The COT power converter 30 having the quick response mechanism 34 can speed up the transient response and reduce the variation of the output voltage Vo.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A constant on-time power converter, comprising:
    an output capacitor, an output inductor and a switching circuit being configured such that the switching circuit is controlled by a control signal to modulate an inductor current flowing through the output inductor and charging the output capacitor to generate an output voltage; and
    a sensing circuit, including:
        a first resistor connected between an end of the output inductor and a node;
        a sense capacitor connected between the node and the other end of the output inductor such that the combination thereof with the first resistor senses the inductor current to generate a feedback signal to determine the control signal;
        a second resistor shunt to the sense capacitor; and
        a third resistor connected between the node and a ground terminal such that the combination thereof with the second and third resistors determines a direct current level of the output voltage.

2. The power converter of claim 1, further comprising a quick response mechanism connected to the sensing circuit to trigger a quick response signal to speed up the transient response of the power converter.

3. The power converter of claim 2, wherein the quick response mechanism comprises:
   a first circuit providing a first signal which is a function of the output voltage;
   a second circuit connected to the first circuit, generating a second signal according to the first signal and a reference voltage;
   a third circuit connected to the second circuit, generating a third signal according to the second signal and the reference voltage; and
   a fourth circuit connected to the third circuit, triggering the quick response signal according to the third signal and the feedback signal.

4. The power converter of claim 3, wherein the first circuit comprises a voltage divider dividing the output voltage to generate the first signal.

5. The power converter of claim 3, wherein the second circuit comprises a transconductive amplifier connected to the first circuit, generating the second signal according to the first signal and the reference voltage.

6. The power converter of claim 3, wherein the third circuit comprises a reference voltage generator connected to the second circuit, generating the third signal according to the second signal and the reference voltage.

7. The power converter of claim 3, wherein the fourth circuit comprises a comparator connected to the third circuit, triggering the quick response signal according to the third signal and the feedback signal.

8. A constant on-time power converter, comprising:
   an output capacitor, an output inductor and a switching circuit being configured such that the switching circuit is controlled by a control signal to modulate an inductor current flowing through the output inductor and charging the output capacitor to generate an output voltage;
   a sensing circuit connected to the output inductor, sensing the inductor current to generate a feedback signal; and
   a quick response mechanism connected to the sensing circuit, triggering a quick response signal according to the feedback signal and the output voltage to speed up the transient response of the power converter;
   wherein the quick response mechanism comprises:
   a first circuit providing a first signal which is a function of the output voltage;
   a second circuit connected to the first circuit, generating a second signal according to the first signal and a reference voltage;
   a third circuit connected to the second circuit, generating a third signal according to the second signal and the reference voltage; and
   a fourth circuit connected to the third circuit, triggering the quick response signal according to the third signal and the feedback signal.

9. The power converter of claim 8, wherein the first circuit comprises a voltage divider dividing the output voltage to generate the first signal.

10. The power converter of claim 8, wherein the second circuit comprises a transconductive amplifier connected to the first circuit, generating the second signal according to the first signal and the reference voltage.

11. The power converter of claim 8, wherein the third circuit comprises a reference voltage generator connected to the second circuit, generating the third signal according to the second signal and the reference voltage.

12. The power converter of claim 8, wherein the fourth circuit comprises a comparator connected to the third circuit, triggering the quick response signal according to the third signal and the feedback signal.

13. A control method for a constant on-time power converter including an output capacitor, an output inductor and a switching circuit being configured such that the switching circuit is controlled by a control signal to modulate an inductor current flowing through the output inductor and charging the output capacitor to generate an output voltage, the control method comprising the steps of:
   sensing the inductor current to generate a feedback signal;
   providing a first signal which is a function of the output voltage;
   generating a second signal according to a difference between the first signal and a reference voltage;
   determining a third signal according to the second signal and the reference voltage; and
   comparing the third signal with the feedback signal to trigger a quick response signal to speed up the transient response of the power converter.

14. The control method of claim 13, further comprising dividing the output voltage to generate the first signal.

* * * * *